United States Patent
Shaw et al.

(10) Patent No.: US 12,154,132 B1
(45) Date of Patent: Nov. 26, 2024

(54) METHODS, SYSTEMS, AND MEDIA FOR DETERMINING THE IMPACT OF CONTENT CAMPAIGNS USING SURVEYS

(71) Applicant: Integral Ad Science, Inc., New York, NY (US)

(72) Inventors: Jason Shaw, Seattle, WA (US); Ana Calabrese, New York, NY (US); Kiril Tsemekhman, Long Island City, NY (US); Mandeep Singh Badwal, New York, NY (US); Katia Eliseeva, Hoboken, NJ (US); Mattia Fumagalli, Brooklyn, NY (US)

(73) Assignee: Integral Ad Science, Inc., New York, NY (US)

( * ) Notice: Subject to any disclaimer, the term of this patent is extended or adjusted under 35 U.S.C. 154(b) by 0 days.

(21) Appl. No.: 16/104,825

(22) Filed: Aug. 17, 2018

Related U.S. Application Data (60) Provisional application No. 62/546,934, filed on Aug. 17, 2017.

(51) Int. Cl.
G06Q 30/02 (2023.01)
G06F 16/958 (2019.01)
G06Q 30/0242 (2023.01)

(52) U.S. Cl.
CPC ....... *G06Q 30/0245* (2013.01); *G06F 16/958* (2019.01)

(58) Field of Classification Search
CPC .............. G06Q 30/02–0277; G06F 16/958
See application file for complete search history.

(56) References Cited

U.S. PATENT DOCUMENTS

| | | | | |
|---|---|---|---|---|
| 10,402,853 | B1* | 9/2019 | Tsemekhman | G06Q 30/0249 |
| 2008/0282290 | A1* | 11/2008 | Malik | G06Q 30/0256 |
| | | | | 725/42 |
| 2010/0131356 | A1* | 5/2010 | Stevens | G06Q 30/0245 |
| | | | | 705/14.44 |
| 2013/0290094 | A1* | 10/2013 | Srivastava | G06Q 30/0245 |
| | | | | 705/14.44 |
| 2014/0129352 | A1* | 5/2014 | Ringdahl | G06Q 30/0275 |
| | | | | 705/14.71 |
| 2018/0365707 | A1* | 12/2018 | Jha | G06Q 30/0245 |

FOREIGN PATENT DOCUMENTS

WO WO-2009097569 A1 * 8/2009 ............. G06Q 30/02

OTHER PUBLICATIONS

Coffey,"Internet Audience Measurement: A Practitioner's View," Journal of interactive Advertising,vol. 1,No. 2, Spring 2001,8 pages.(Year:2001) (Year: 2001).*

* cited by examiner

*Primary Examiner* — Raquel Alvarez
(74) *Attorney, Agent, or Firm* — Byrne Poh LLP (57) ABSTRACT

Methods, systems, and media for determining the impact of content campaigns using surveys are provided. In some embodiments, approaches for measuring the impact of content campaigns with attitudinal metrics assessed through surveys are provided.

14 Claims, 3 Drawing Sheets

METHODS, SYSTEMS, AND MEDIA FOR DETERMINING THE IMPACT OF CONTENT CAMPAIGNS USING SURVEYS

CROSS-REFERENCE TO RELATED APPLICATIONS

This application claims the benefit of U.S. Provisional Patent Application No. 62/546,934, filed Aug. 17, 2017, which is hereby incorporated by reference herein in its entirety.

TECHNICAL FIELD

The disclosed subject matter relates to methods, systems, and media for determining the impact of content campaigns using surveys. More particularly, the disclosed subject matter relates to measuring the impact of content campaigns with attitudinal metrics assessed through surveys.

BACKGROUND

The effectiveness of an online advertising campaign can be measured using various techniques. One technique includes conducting online surveys of users that may or may not have been exposed to an advertising campaign. However, in conducting online surveys, it continues to be difficult to determine which users have viewed the advertising campaign in question.

Accordingly, it is desirable to provide methods, systems, and media for determining the impact of content campaigns using surveys.

SUMMARY

In accordance with some embodiments of the disclosed subject matter, mechanisms for determining the impact of content campaigns using surveys are provided.

In accordance with some embodiments of the disclosed subject matter, a method for determining an impact of content is provided, the method comprising: receiving, using a hardware processor of a server device, a plurality of users for receiving a content item in a content campaign, wherein each of the plurality of users is associated with a user identifier and the content item is associated with a content identifier; dividing, using the hardware processor, the plurality of users into a test group and a control group by: (i) receiving, for each user of the plurality of users, a request for loading a content item on a web page, wherein the request included code that directs the request to the server device; (ii) inserting a parametrized pixel image into the code, wherein the parametrized pixel image is loaded in connection with the content item being presented on the web page and wherein the parameterized pixel image is associated with a user of the plurality of users; (iii) causing the parametrized pixel image to be loaded on a web browsing application executing on a user device in connection with the content item being presented on a web page; (iv) determining whether the content item including the parametrized pixel image was scrolled into view by determining whether the parametrized pixel image has been rendered by the web browser application executing on the user device; (v) assigning the user to one of the test group and the control group based on the determination of whether the parametrized pixel image has been rendered by the web browser application executing on the user device; and (vi) generating a first record that includes the content identifier, the user identifier, and a viewability indication corresponding to the presentation of the content item by the web browsing application executing on the user device; transmitting, using the hardware processor, for the parametrized pixel image, the user identifier and the content identifier to a survey administration device; retrieving, using the hardware processor, a second record from the survey administration device that includes a plurality of user identifiers and a plurality of survey responses associated with each of the plurality of user identifiers, wherein each of the plurality of survey responses corresponds to a survey presented on the web browser application executing on the user device and is associated with the parametrized pixel image; determining, using the hardware processor, whether the survey responses associated from the second record match with the first record that includes the content identifier, the user identifier, and a viewability indication corresponding to the presentation of the content item by the web browsing application executing on the user device; generating, using the hardware processor, a first content viewing history for the test group that includes content items in which survey responses were received for each of the plurality of users assigned to the test group based on matching the survey responses in the second record with content viewability information in the first record; generating, using the hardware processor, a second content viewing history for the control group that includes content items in which survey responses were received for each of the plurality of users assigned to the control group based on matching the survey responses in the second record with content viewability information in the first record; determining, using the hardware processor, an effectiveness score of the content item based on a comparison of the first content viewing history and the second content viewing history; and modifying, using the hardware processor, the content item associated with the web page based on the effectiveness score.

In some embodiments, the request is directed to a first server device for retrieving the content item for presentation on the web page, wherein the code included with the request redirects the request to a second server device for inserting the parametrized pixel image into the request, and wherein the first server device and the second server device are different.

In some embodiments, the parametrized pixel image associated with the content item is received from the survey administration device and wherein the parametrized pixel image is associated with the content identifier.

In some embodiments, the user associated with the user identifier is assigned to the test group in response to determining that the parametrized pixel image was rendered by the web browser application executing on the user device and wherein the test group is modified to include the user identifier.

In some embodiments, the user associated with the user identifier is assigned to the control group in response to determining that the parametrized pixel image was not rendered by the web browser application executing on the user device and wherein the control group is modified to include the user identifier.

In some embodiments, the method further comprises generating the control group by randomly assigning the user associated with the user identifier to the control group, wherein the control group is modified to include the user identifier.

In some embodiments, the method further comprises randomly assigning the user associated with the user identifier to one of the test group and the control group in response to receiving the request for loading the content item on the web page.

In some embodiments, the method further comprises, in response to assigning the user associated with the user identifier to the control group, inhibiting the content item from being presented and causing a different content item to be presented. In some embodiments, the different content item is a public service announcement that replaces the presentation of the content item on the web page.

In some embodiments, the method further comprises, in response to assigning the user associated with the user identifier to the control group, transmitting a do-not-target content notification to a content provider associated with the content campaign.

In some embodiments, the method further comprises, in response to assigning the user associated with the user identifier to the test group, transmitting the content item associated with the content campaign to the web page and additional content items associated with the content campaign to the user associated with the user identifier until a particular exposure level has been reached. In some embodiments, the method further comprises, in response to determining that the particular exposure level has been reached, inhibiting one or more content item associated with the content campaign from being presented and transmitting a do-not-target content notification to a content provider associated with the content campaign.

In some embodiments, each of the plurality of survey responses corresponds to the survey presented on the web browser application executing on the user device and wherein the survey comprises a plurality of survey questions.

In some embodiments, the method further comprises: mapping each survey response to each of the plurality of survey questions in the survey to a response score; and generating a survey response score based on the response score from each survey response to each of the plurality of survey questions in the survey, wherein the user identifier, the content identifier, and the survey response score are associated.

In some embodiments, the method further comprises: determining a first group-level survey response score for the first content viewing history for the test group; determining a second group-level survey response score for the second content viewing history for the control group; and determining a difference between the first group-level survey response score and the second group-level survey response score.

In some embodiments, the method further comprises determining whether a statistical significant exists between the first group-level survey response score and the second group-level survey response score.

In some embodiments, the method further comprises generating a plurality of subsets of the test group that each includes statistically similar users based on the first content viewing history associated with each of the plurality of users associated to the test group, wherein the first group-level survey response score is determined for each of the plurality of subsets of the test group and wherein a comparison is performed between the first group-level survey response score associated with each of the plurality of subsets of the test group to determine whether a statistical significance exists.

In some embodiments, the method further comprises generating a subset of the control group that includes statistically similar users based on the first content viewing history associated with each of the plurality of users associated to the control group, wherein the second group-level survey response score is determined for the subset of the control group.

In some embodiments, modifying the content item associated with the web page based on the effectiveness score further comprises replacing the content item with a second content item.

In accordance with some embodiments of the disclosed subject matter, a system for determining an impact of content is provided, the system comprising a memory and a hardware processor that, when executing computer executable instructions stored in the memory, is configured to: receive a plurality of users for receiving a content item in a content campaign, wherein each of the plurality of users is associated with a user identifier and the content item is associated with a content identifier; divide the plurality of users into a test group and a control group by: (i) receiving, for each user of the plurality of users, a request for loading a content item on a web page, wherein the request included code that directs the request to a server device; (ii) inserting a parametrized pixel image into the code, wherein the parametrized pixel image is loaded in connection with the content item being presented on the web page and wherein the parameterized pixel image is associated with a user of the plurality of users; (iii) causing the parametrized pixel image to be loaded on a web browsing application executing on a user device in connection with the content item being presented on a web page; (iv) determining whether the content item including the parametrized pixel image was scrolled into view by determining whether the parametrized pixel image has been rendered by the web browser application executing on the user device; (v) assigning the user to one of the test group and the control group based on the determination of whether the parametrized pixel image has been rendered by the web browser application executing on the user device; and (vi) generating a first record that includes the content identifier, the user identifier, and a viewability indication corresponding to the presentation of the content item by the web browsing application executing on the user device; transmit, for the parametrized pixel image, the user identifier and the content identifier to a survey administration device; retrieve a second record from the survey administration device that includes a plurality of user identifiers and a plurality of survey responses associated with each of the plurality of user identifiers, wherein each of the plurality of survey responses corresponds to a survey presented on the web browser application executing on the user device and is associated with the parametrized pixel image; determine whether the survey responses associated from the second record match with the first record that includes the content identifier, the user identifier, and a viewability indication corresponding to the presentation of the content item by the web browsing application executing on the user device; generate a first content viewing history for the test group that includes content items in which survey responses were received for each of the plurality of users assigned to the test group based on matching the survey responses in the second record with content viewability information in the first record; generate a second content viewing history for the control group that includes content items in which survey responses were received for each of the plurality of users assigned to the control group based on matching the survey responses in the second record with content viewability information in the first record; determine an effectiveness score of the content item based on a comparison of the first content viewing history and the second content viewing history; and modify the content item associated with the web page based on the effectiveness score.

In accordance with some embodiments of the disclosed subject matter, a non-transitory computer-readable medium containing computer-executable instructions that, when executed by a hardware processor, cause the hardware processor to perform a method for determining an impact of content is provided, the method comprising: receiving a plurality of users for receiving a content item in a content campaign, wherein each of the plurality of users is associated with a user identifier and the content item is associated with a content identifier; dividing the plurality of users into a test group and a control group by: (i) receiving, for each user of the plurality of users, a request for loading a content item on a web page, wherein the request included code that directs the request to a server device; (ii) inserting a parametrized pixel image into the code, wherein the parametrized pixel image is loaded in connection with the content item being presented on the web page and wherein the parameterized pixel image is associated with a user of the plurality of users; (iii) causing the parametrized pixel image to be loaded on a web browsing application executing on a user device in connection with the content item being presented on a web page; (iv) determining whether the content item including the parametrized pixel image was scrolled into view by determining whether the parametrized pixel image has been rendered by the web browser application executing on the user device; (v) assigning the user to one of the test group and the control group based on the determination of whether the parametrized pixel image has been rendered by the web browser application executing on the user device; and (vi) generating a first record that includes the content identifier, the user identifier, and a viewability indication corresponding to the presentation of the content item by the web browsing application executing on the user device; transmitting, for the parametrized pixel image, the user identifier and the content identifier to a survey administration device; retrieving a second record from the survey administration device that includes a plurality of user identifiers and a plurality of survey responses associated with each of the plurality of user identifiers, wherein each of the plurality of survey responses corresponds to a survey presented on the web browser application executing on the user device and is associated with the parametrized pixel image; determining whether the survey responses associated from the second record match with the first record that includes the content identifier, the user identifier, and a viewability indication corresponding to the presentation of the content item by the web browsing application executing on the user device; generating a first content viewing history for the test group that includes content items in which survey responses were received for each of the plurality of users assigned to the test group based on matching the survey responses in the second record with content viewability information in the first record; generating a second content viewing history for the control group that includes content items in which survey responses were received for each of the plurality of users assigned to the control group based on matching the survey responses in the second record with content viewability information in the first record; determining an effectiveness score of the content item based on a comparison of the first content viewing history and the second content viewing history; and modifying the content item associated with the web page based on the effectiveness score.

In accordance with some embodiments of the disclosed subject matter, a system for determining an impact of content is provided, the system comprising: means for receiving a plurality of users for receiving a content item in a content campaign, wherein each of the plurality of users is associated with a user identifier and the content item is associated with a content identifier; means for dividing the plurality of users into a test group and a control group that includes: (i) means for receiving, for each user of the plurality of users, a request for loading a content item on a web page, wherein the request included code that directs the request to a server device; (ii) means for inserting a parametrized pixel image into the code, wherein the parametrized pixel image is loaded in connection with the content item being presented on the web page and wherein the parameterized pixel image is associated with a user of the plurality of users; (iii) means for causing the parametrized pixel image to be loaded on a web browsing application executing on a user device in connection with the content item being presented on a web page; (iv) means for determining whether the content item including the parametrized pixel image was scrolled into view by determining whether the parametrized pixel image has been rendered by the web browser application executing on the user device; (v) means for assigning the user to one of the test group and the control group based on the determination of whether the parametrized pixel image has been rendered by the web browser application executing on the user device; and (vi) means for generating a first record that includes the content identifier, the user identifier, and a viewability indication corresponding to the presentation of the content item by the web browsing application executing on the user device; means for transmitting, for the parametrized pixel image, the user identifier and the content identifier to a survey administration device; means for retrieving a second record from the survey administration device that includes a plurality of user identifiers and a plurality of survey responses associated with each of the plurality of user identifiers, wherein each of the plurality of survey responses corresponds to a survey presented on the web browser application executing on the user device and is associated with the parametrized pixel image; means for determining whether the survey responses associated from the second record match with the first record that includes the content identifier, the user identifier, and a viewability indication corresponding to the presentation of the content item by the web browsing application executing on the user device; means for generating a first content viewing history for the test group that includes content items in which survey responses were received for each of the plurality of users assigned to the test group based on matching the survey responses in the second record with content viewability information in the first record; means for generating a second content viewing history for the control group that includes content items in which survey responses were received for each of the plurality of users assigned to the control group based on matching the survey responses in the second record with content viewability information in the first record; means for determining an effectiveness score of the content item based on a comparison of the first content viewing history and the second content viewing history; and means for modifying the content item associated with the web page based on the effectiveness score.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Mechanisms for determining the impact of content campaigns using surveys are provided.

Generally speaking, the mechanisms described herein relate to determining the impact of content campaigns using surveys, which can include (i) dividing an audience of a content campaign into a control group and one or more test groups, (ii) matching survey respondents to individuals in the audience of the content campaign; and (iii) determining population statistical information for each of the test groups and determining whether there are statistically significant differences between the test groups.

In some embodiments, a control group for a survey can be generated based on which users scrolled an advertisement into view and which users did not perform such an action. For example, in some embodiments, the mechanisms can cause a parametrized pixel image to be loaded in connection with an advertisement on a web page. It should be noted that the code placed in the web page can load an image pixel parametrized with the unique identifier associated with the content item. The mechanisms can then determine whether the user scrolled the associated advertisement into view by determining whether the parametrized pixel image has been rendered by a web browser application executing on a user device. In some embodiments, the parametrized pixel image can be associated with, parametrized with, and/or correspond to information identifying a user or user account and/or information identifying an advertisement impression. In some embodiments, using the information identifying a user and/or information identifying an advertisement impression, the mechanisms can assign the user and/or advertisement impression to one of a control group or a test group.

In some embodiments, a control group can be generated by randomly placing a user or user device from multiple users or user devices into a control group and identifying the user or the user device using browser cookies. For example, in response to receiving a request for an advertisement or other content item, the mechanisms can randomly assign a device and/or user requesting the advertisement to either a control group or a test group, and store an identifier associated with the user, the device, the control group, and/or the test group in a browser cookie. In response to assigning the device and/or user to a control group, the mechanisms can inhibit one advertisement from being presented, and instead cause a different advertisement to be presented. In a more particular example, in response to receiving a request from a user to load a campaign advertisement, the mechanisms can intercept or otherwise redirect the request (referred to hereinbelow as the Firewall, Firewall server, or advertising service device). If the Firewall server determines that the user is in the control group, the advertisement can be inhibited from being presented and a service announcement or other campaign advertisement can be delivered in its place. In some embodiments, the mechanisms using the Firewall server can transmit a do-not-target notification to the advertiser server, thereby to prevent unnecessary costs going forward in connection with this user. Alternatively, if the Firewall server determines that the user is in a test group, no action may be taken. In some embodiments in which test groups with multiple levels of exposure are desired, the Firewall server can allow a user to receive advertisements until the desired exposure level has been reached, at which point subsequent ads can be inhibited from being presented and a do-not-target notification can be transmitted.

In some embodiments, the mechanisms can cause users to be presented with a survey and associate survey responses with either a control group or a test group. For example, the mechanisms can cause information identifying a user and/or a user device to a third party survey server or administrator, and can cause a survey of the third party survey administrator to be presented to the user and/or the user device. The mechanisms can then receive survey responses in connection with information identifying a user and/or a user device associated with the survey responses, and then associate the survey responses with either a control group or a test group based on the information identifying the user and/or the user device. Additionally or alternatively, in some embodiments, the mechanisms can use the identifying information to determine whether a user device rendered a parametrized pixel image, and can assign survey responses to a control group test group based on the determination.

In some embodiments, the mechanisms can compare survey responses in the test group with survey responses in the control group to determine effectiveness of an advertisement. For example, the mechanisms can determine the effectiveness based on a difference in survey responses (e.g., a difference in average survey responses) between the test group and the control group.

Figure 1:
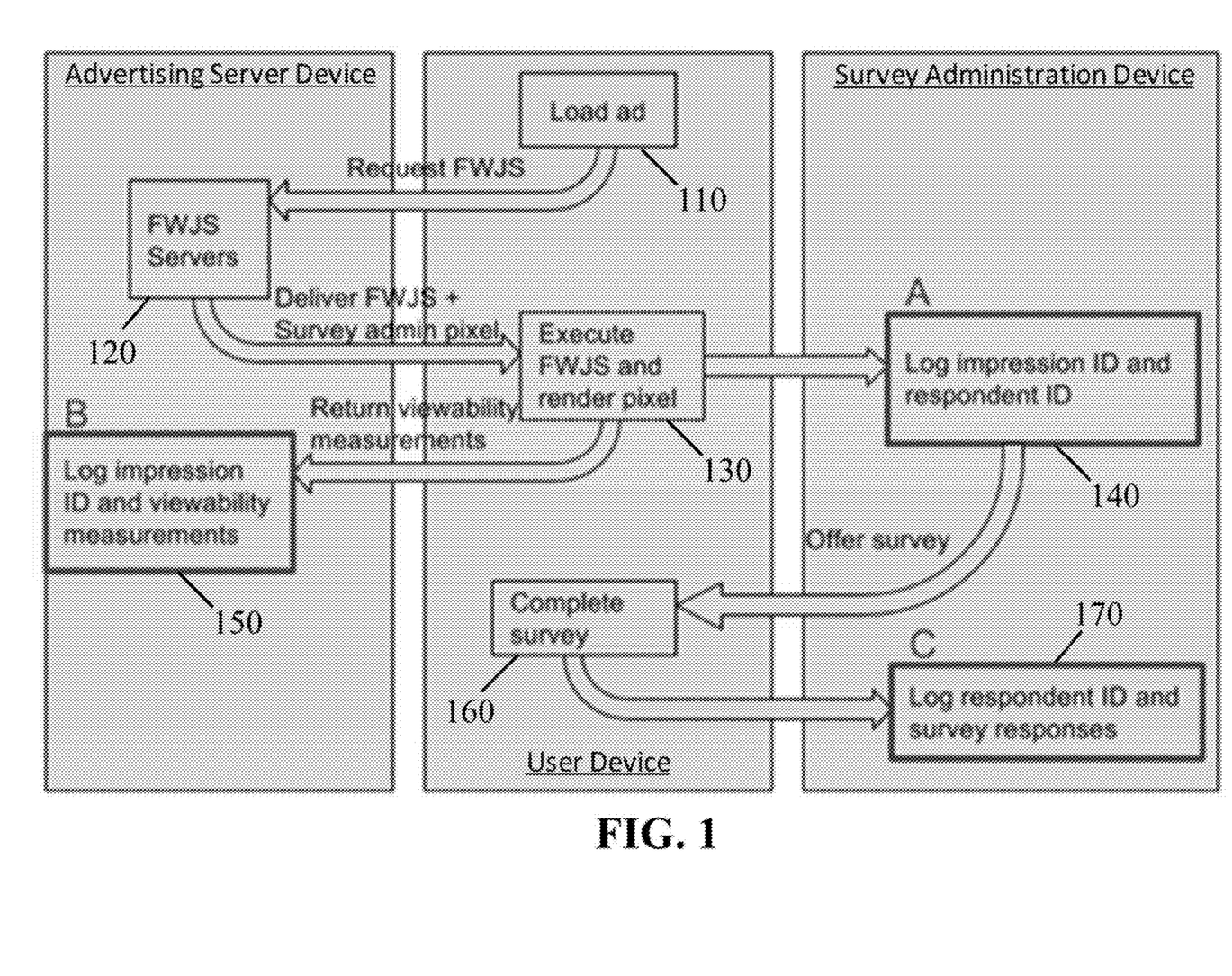
FIG. 1 is an illustrative example of a process for determining the impact of content campaigns using surveys in accordance with some embodiments of the disclosed subject matter.

FIG. 1 shows a flow diagram of an illustrative example 100 of a process for determining the impact of content campaigns using surveys. As shown, process 100 can include an advertising server device, a user device, and a survey administration device.

In some embodiments, the system can include an advertising server device. As shown in FIG. 1, the advertising server device can be any device suitable for processing information related to advertisements, serving advertisements, and/or logging information related to advertisements. For example, in response to receiving content viewability information from a parametrized pixel image executing on a web browser application of a user device, the advertising server device can generate a record that associates content identifiers relating to the content items for which content viewability information was received, user identifiers associated with the user or user device that viewed the content item and/or rendered the parametrized pixel image, and the content viewability information.

Although FIG. 1 displays an advertising server device including a FWJS server (sometimes referred to as a Firewall JavaScript server), it should be noted that an advertising server device can be implemented using any suitable number of server devices, including one, two, or more server devices. In some embodiments, an advertising server device can log information related to internet browsing of users that consent to have such information logged.

In some embodiments, the system can include one or more user devices. As shown in FIG. 1, the user device can be any device suitable for requesting and/or presenting advertisements. For example, the user device can be instructed to access a web page using a web browser application executing on the user device, where the web page can include one or more content items for presentation on the web page. In another example, the user device can, in response to a request for a content item, render a parametrized pixel image and/or execute any other suitable code in connection with the presentation of a content item on a web page. In continuing this example, the rendering of the parametrized pixel image by the user device can cause the user device to transmit viewability information relating to the content item to the advertising server device. It should be noted that the code can monitor and/or record viewability information associated with the presentation of the parametrized pixel image and/or the content item on the user device, where such viewability information can include, for example, an indication of whether the content item was rendered on a display of the user device (e.g., whether the content item was in-view), an indication of an amount of time that the content item was presented on the display of the user device (e.g., a start time, an end time, etc.).

In some embodiments, the system can include a survey administration device. As shown in FIG. 1, the survey administration device can be any device suitable for transmitting offers to participate in surveys, transmitting surveys, receiving survey responses, and/or recording survey data. For example, the survey administration device can provide the parametrized pixel image that corresponds with a content item in a content campaign. In a more particular example, the survey administration device can generate a parametrized pixel image that includes a content identifier (e.g., an impression ID) and other content information and can transmit the parametrized pixel image to the advertising server device, where the advertising server device can insert, append, or otherwise incorporate the parametrized pixel image with the content item being requested. In another example, in response to the parametrized pixel image being rendered by a web browsing application executing on a user device, the survey administration device can associate the content identifier (e.g., an impression ID) and the user identifier (e.g., a respondent ID) in a record or log. In yet another example, the survey administration device can transmit a survey having one or more survey questions to a user device, where one or more survey responses in a completed survey and one or more user identifiers can be associated in the record or log.

It should be understood that, although FIG. 1 depicts one advertising server device and one survey administration device, as separate devices, in some embodiments, these can be implemented as a single device, any suitable number of devices, and/or any suitable combination of devices. For example, the advertising server device can perform the survey features of survey administration device.

In some embodiments, process 100 can begin by a user device loading an advertisement or any other suitable content item on a web page at 110. In some embodiments, the request can include code that directs the request to the advertising server device. While some implementations retrieve a content item, such as an advertisement, from an advertising server device in response to a content request, the content request to load a content item at 102 can include code that allows an advertising server device, such as a Firewall server (e.g., a different advertising server device than an advertising server device associated with a content provider that provides one or more content items for presentation), to intercept the content request.

Redirection features are further described, for example, in commonly owned, commonly assigned U.S. Patent Application Publication No. 2011/0106634, which is hereby incorporated by reference herein in its entirety.

Additionally or alternatively, process 100 can begin by a user device transmitting a request for an advertisement or a content item.

In some embodiments, process 100 can, at 120, continue by receiving, at an advertising server device, any suitable request in connection with an advertisement or content item. For example, at 120, process 100 can receive a request for an advertisement, and/or a request for survey administration information associated with an advertisement. As another example, process 100 can receive a request to permit an advertisement to be delivered to a user device.

In some embodiments, process 100 can continue by transmitting any suitable survey administration information. For example, survey administration information can include a parametrized pixel image associated with a survey and/or associated with an administrator of a survey. In a more particular example, process 100 can insert a parametrized pixel image into the code, where the parametrized pixel image is loaded in connection with the content item being presented on the web page.

In some embodiments, an advertising serving device can receive survey administration information that includes a parametrized pixel image associated with a content item of a content campaign from a survey administration device. For example, the survey administration device can transmit the parametrized pixel image to the advertising serving device, where the parametrized pixel image is associated with a content identifier (e.g., an impression ID), a campaign identifier (e.g., a campaign ID), and/or any other suitable information. As described hereinbelow, the parametrized pixel image can be inserted into code that is responsive to the content request.

In some embodiments, process 100 can transmit survey administration information (e.g., code having the inserted parametrized pixel image) in response to receiving a request for an advertisement at 130. Additionally or alternatively, in response to receiving a request for an advertisement, process 100 can inhibit an advertisement from being presented and/or cause a replacement advertisement to be presented, as described below.

In some embodiments, survey administration information can include instructions for causing a parametrized pixel image to be presented in connection with an advertisement. For example, survey administration information can include rendering instructions for causing a parametrized pixel image to be presented. As another example, survey administration information can include instructions for causing a parametrized pixel image to be generated. In such an example, a parametrized pixel image can be generated based on identifying information such as an impression identifier, a user identifier, a survey identifier, and/or any other suitable identifying information.

In some embodiments, a parametrized pixel image can correspond to identifying information such as an impression identifier, a user identifier, a survey identifier, and/or any other suitable identifying information.

In some embodiments, process 100 can continue by causing a parametrized pixel image to be loaded in connection with an advertisement or content item at 130. A parametrized pixel image can be loaded, for example, by a web browser application and/or any other application suitable for presenting advertisements and other content items. For example, the parametrized pixel image can be loaded in connection with the content item being presented on the web page. In a more particular example, the parametrized pixel image can be rendered in response to the parametrized pixel image and/or the corresponding content item being in view on the web page being displayed on a display of the user device by the web browser application executing on the user device. In another more particular example, the code placed in the web page can cause a web browser application executing on a user device to load an image pixel parametrized with a unique identifier associated with the content item.

In some embodiments, at 130, process 100 can further cause a parametrized pixel image to be rendered in connection with an advertisement. For example, a parametrized pixel image can be rendered by a web browser in response to a user scrolling a web page to a location of the web page corresponding to the parametrized pixel image and/or corresponding to an advertisement associated with the parametrized pixel image. In some embodiments, a parametrized pixel image can be presented within an advertisement, adjacent to an advertisement, prior to an advertisement, after an advertisement, and/or presented in connection with an advertisement using any other suitable technique or combination of techniques.

In some embodiments, process 100 can further cause any suitable information about a rendering of a parametrized pixel image to be recorded. For example, information about a rendering of a parametrized pixel image can include whether the parametrized pixel image was rendered, a duration of time during which the parametrized pixel image was rendered, and/or information about a location at which the parametrized pixel image was rendered.

In some embodiments, process 100 can continue by logging any suitable identifying information and any suitable information about a rendering of a parametrized pixel image. In some embodiments, any suitable device can log identifying information and/or information about a rendering of a parametrized pixel image, such as an advertising server device, a user device, and/or a survey administration device. As a more particular example, such information can be logged at a user device, and transmitted to a server device and/or a survey administration device for further logging.

In a more particular example, at 140, in response to rendering and/or loading the parametrized pixel image by a web browser application executing on a user device, the survey administration device can generate a record of the parametrized pixel image along with a user identifier (e.g., a panelist identifier), a content identifier (e.g., an impression ID), and other information associated with the rendered parametrized pixel image.

In another more particular example, at 150, in response to rendering and/or loading the parametrized pixel image by a web browser application executing on a user device, the advertising server device can generate a record of the parametrized pixel image along with a user identifier (e.g., a panelist identifier), a content identifier (e.g., an impression ID), and content viewability information associated with the rendered parametrized pixel image. Such content viewability information can include an indication of whether a content item associated with the parametrized pixel image was rendered on a display of a user device and a duration of how long the parametrized pixel image was rendered on a display of a user device (e.g., a start time and an end time, a total time, etc.).

In some embodiments, at 160, process 100 can continue by transmitting an offer to participate in a survey to a user device. In some embodiments, such an offer can be transmitted by a survey administration device. In some embodiments, such an offer can be transmitted to a user device in response to receiving information from the user device that corresponds to a parametrized pixel image associated with a survey to be offered. For example, in response to rendering and/or loading the parametrized pixel image by a web browser application executing on a user device, the survey administration device or the advertising server device can determine whether a user of the user device should receive a survey (e.g., based on the content item being in-view, based on the content item being in-view for a particular amount of time, based on the content item being in-view in light of the current exposure level, etc.). In another example, in response to rendering and/or loading the parametrized pixel image by a web browser application executing on a user device, the survey administration device or the advertising server device can determine whether a user of the user device has provided specific authorization or permission to allow the survey administration device to store cookies or other suitable code within the web browsing application containing an individual identifier.

In some embodiments, an offered survey can contain any suitable questions. For example, an offered survey can include questions related to attitudinal metrics, such as brand favorability, brand recall, and/or ad recall. In such an example, the questions can further be related to an advertisement associated with a parametrized pixel image. As another example, an offered survey can include questions, to be used as control questions, that are related to advertisements and/or brands that are unrelated to an advertisement associated with the offered survey. As yet another example, an offered survey can include questions related to a user, such as demographic questions and/or any other suitable questions related to a user.

In some embodiments, at 170, process 100 can continue by receiving and logging survey responses of completed surveys and identifying information. In some embodiments, survey responses and identifying information can be received and/or logged at a survey administration device.

In some embodiments, including situations in which process 100 involves at least one advertising server device and at least one survey administration device, process 100 can compare identifying information received by each device to match survey responses to the identifying information. For example, process 100 can retrieve a record from the survey administration device that includes multiple user identifiers and multiple survey responses associated with each of the multiple user identifiers, where each of the survey responses corresponds to a survey presented on the web browser application executing on the user device and is associated with the parametrized pixel image. In continuing this example, process 100 can determine whether the survey responses associated from the record match with a record at the advertising server device that includes the content identifier, the user identifier, and a viewability indication corresponding to the presentation of the content item by the web browsing application executing on the user device. In a more particular example, in response to determining that a user identifier (e.g., a user ID) in a record of viewability information stored at the advertising server device matches a user identifier (e.g., a respondent ID) in a record of survey response information stored at the survey administration device, process 100 can generate a content viewing history that includes the content items in which survey responses were received.

As described herein, the users associated with a content campaign can be divided into a control group and one or more test groups.

In some embodiments, based on identifying information, process 100 can assign a user to a test group and/or control group based on a parametrized pixel image or other suitable monitoring code that is used to monitor survey responses. For example, in response to determining that an advertisement or other suitable content associated with such a parametrized pixel image was rendered in view on a device of the user, process 100 can determine whether the user and/or the device of the user should be assigned to a test group or a control group. In a more particular example, the user associated with the user identifier can be assigned to a test group or one of multiple test groups in response to determining that the parametrized pixel image was rendered by the web browser application executing on the user device, where the test group can be modified to include the user identifier. In another more particular example, the user associated with the user identifier can be assigned to the control group in response to determining that the parametrized pixel image was not rendered by the web browser application executing on the user device, where the control group can be modified to include the user identifier.

In some embodiments, process 100 can randomly assign a user, a user device, and/or an impression to a control group and/or a test group based on the identifying information. For example, process 100 can generate the control group by randomly assigning the user associated with the user identifier to the control group, where the control group can be modified to include the user identifier. In another example, process 100 can generate multiple test groups by randomly assigning the user associated with the user identifier to one of multiple test groups in response to determining that the parametrized pixel image was rendered by the web browser application executing on the user device, where the test group can be modified to include the user identifier. In yet another example, process 100 can randomly assign the user associated with the user identifier to the test group or the control group in response to receiving the request for loading the content item on the web page.

It should be noted that, in some embodiments, in response to assigning the user associated with the user identifier to the control group, process 100 can inhibit the content item from being presented and causing a different content item to be presented. For example, process 100 can generate a public service announcement that replaces the presentation of the content item on the web page. It should also be noted that, in some embodiments, in response to assigning the user associated with the user identifier to the control group, process 100 can transmit a do-not-target content notification to a content provider (e.g., a content provider server) associated with the content campaign. As such, the do-not-target content notification can, upon receipt, cause the content provider to inhibit the presentation of content items associated with the content provider to the user of the user identifier, thereby preventing unnecessary costs going forward.

It should further be noted that, in some embodiments, in response to assigning the user associated with the user identifier to the test group, process 100 can transmit the content item associated with the content campaign to the web page and additional content items associated with the content campaign to the user associated with the user identifier until a particular exposure level has been reached. For example, in response to determining that the particular exposure level has been reached (e.g., a count of the number of impressions that can include both viewable impressions and unviewable impressions served per user over a total amount of time that all of a given set of impressions served to a given user has been in view), process 100 can inhibit one or more content item associated with the content campaign from being presented. In another example, in response to determining that the particular exposure level has been reached, process 100 can transmit a do-not-target content notification to a content provider (e.g., a content provider server) associated with the content campaign. As such, the do-not-target content notification can, upon receipt, cause the content provider to inhibit the presentation of content items associated with the content provider to the user of the user identifier, thereby preventing unnecessary costs going forward.

Content exposure levels and other approaches for inhibiting the transmission of content items based on frequency and/or exposure measurements are further described, for example, in commonly owned, commonly assigned U.S. patent application Ser. No. 15/973,380, filed May 7, 2018, and U.S. patent application Ser. No. 16/053,151, filed Aug. 2, 2018, each of which is hereby incorporated by reference herein in its entirety.

As another example, process 100 can pre-assign a user, a user device, and/or an impression to a control group and/or a test group in advance of receiving survey responses, and subsequent to receiving survey responses, determine whether identifying information corresponds to a user, a user device, and/or an impression assigned to the control group and/or the test group.

In some embodiments, process 100 can determine that a survey response is associated with a test group or a control group based on information about rendering of a parametrized pixel image. For example, based on information indicating that a parametrized pixel image is associated with an advertisement, process 100 can assign a user or a device associated with the user to a test group or a control group. Accordingly, a received survey response can be associated with an assigned control group or test group corresponding to the user or device.

In some embodiments, process 100 can assign a user to a particular group based on an amount of time that the parametrized pixel has been presented. For example, in response to information indicating that a parametrized pixel image was displayed in view for a period of time that is less than a predetermined threshold period of time, process 100 can assign a user to a control group and associate one or more survey responses to that control group. In another example, in response to information indicating that a parametrized pixel image was displayed in view for a period of time that is greater than a predetermined threshold period of time, process 100 can assign a user to a test group and associate one or more survey responses to that test group.

In some embodiments, process 100 can continue by comparing survey responses in one or more test groups with survey responses in one or more control groups to identify statistically significant differences. In some embodiments, process 100 can sub-divide a test group and/or a control group based on demographic information and/or characteristics of users, user devices, and/or impressions associated with the test group and/or the control group.

In a more particular example, a first content viewing history for the test group that includes content items in which survey responses were received for each of the plurality of users assigned to the test group can be generated based on the matching described above. In continuing this example, a second content viewing history for the control group that includes content items in which survey responses were received for each of the plurality of users assigned to the control group based on the matching described above. In turn, process 100 can determine an effectiveness score of the content item based on a comparison of the first content viewing history and the second content viewing history.

In some embodiments, each survey response corresponding to a survey question in a survey can be mapped to a response score. For example, each survey question can be analyzed for campaign impact by mapping each survey response to a numeric score (e.g., 0 through 10).

In some embodiments, a survey response score can be generated based on the response score from each survey response to each of the survey questions in the survey. For example, the response score can be averaged over the survey questions in the survey. In another example, a survey administration device or any other suitable entity can associated particular weights to particular survey questions (e.g., weighting brand favorability questions higher than advertisement recall questions). In continuing these examples, the survey response score for can be associated with the corresponding user identifier and the corresponding content identifier.

In some embodiments, a group-level survey response score can be generated based on the response scores and based on the groupings. For example, a first group-level survey response score for the above-mentioned first content viewing history for the test group can be determined and a second group-level survey response score for the above-mentioned second content viewing history for the control group can be determined. In a more particular example, a mean or median of the survey response scores for each test and control group of respondents can be determined.

In some embodiments, these survey response scores, such as the group-level survey response scores, can be used to determine a difference between the first group-level survey response score and the second group-level survey response score. For example, process 100 can perform a statistical significance test based on the first group-level survey response score and the second group-level survey response score. In a more particular example, the comparison of the first group-level survey response score and the second group-level survey response score can be used to determine the statistical significance or impact of the content item in the content campaign.

It should be noted that, in some embodiments, multiple subsets of the test group can be generated by analyzing the content viewing histories associated with the user assigned to the test group and grouping statistically similar users into the different subsets based on their content viewing histories. In continuing this example, group-level survey responses can be determined for each of the subsets of the test group to determine whether a statistical significance on the difference between the group-level survey responses of the subsets exists.

In some embodiments, process 100 can modify the content item associated with the web page and the content campaign based on the effectiveness score.

In some embodiments, process 100 can continue by inhibiting an advertisement from being presented to a user device based on any suitable information. For example, process 100 can inhibit an advertisement from being presented on a user device based on information indicating that the user device is associated with a test group, and information indicating that the user device has previously been presented with the advertisement a number of times that is greater than or equal to a predetermined threshold number of times.

In some embodiments, inhibiting an advertisement from being presented can include causing a replacement advertisement and/or other suitable media content to be presented.

Figure 2:
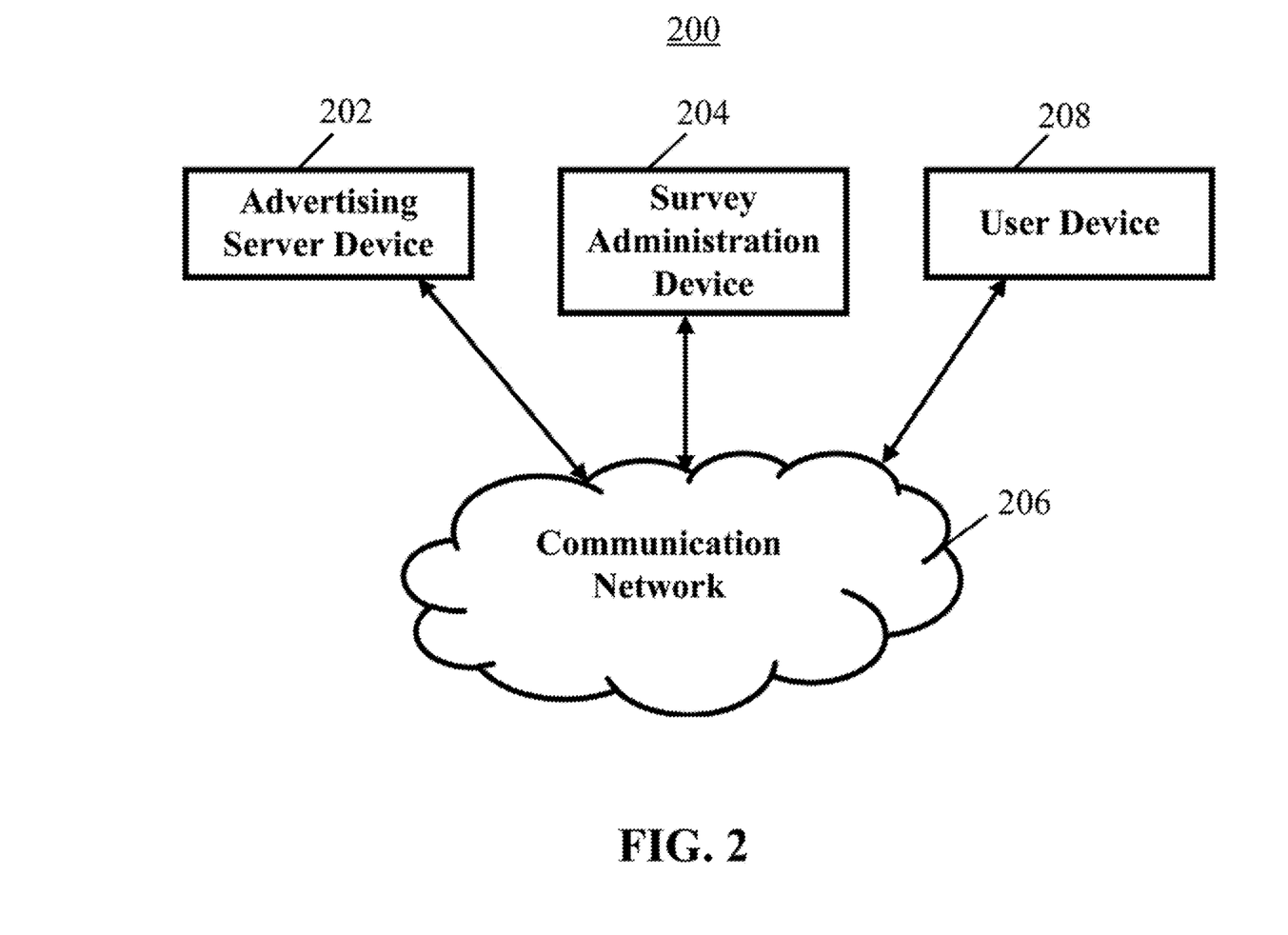
FIG. 2 shows a schematic diagram of an illustrative system suitable for implementation of the mechanisms described herein for determining the impact of content campaigns using surveys in accordance with some embodiments of the disclosed subject matter.

Turning to FIG. 2, an example 200 of hardware for determining the impact of content campaigns using surveys that can be used in accordance with some embodiments of the disclosed subject matter is shown. As illustrated, hardware 200 can include one or more servers, such as advertising server device 202 and survey administration device 204, a user device 208, and a communication network 206.

Advertising server device 202 can be any server suitable for requesting advertisements, transmitting advertisements, and/or transmitting authorization for advertisements to be presented. In some embodiments, advertising server device 202 can request advertisements to be placed on a web page to be presented on user device 208 and can include survey administration information associated with survey administration device 204. In some embodiments, advertising server device 202 can be used to implement an advertising server device as described above in connection with FIG. 1.

Survey administration device 204 can be any suitable server for hosting, recording, and/or distributing surveys. In some embodiments, survey administration device 204 can be used to implement a survey administration device as described above in connection with FIG. 1.

Communication network 106 can be any suitable combination of one or more wired and/or wireless networks in some embodiments. For example, communication network 106 can include any one or more of the Internet, a mobile data network, a satellite network, a local area network, a wide area network, a telephone network, a cable television network, a WiFi network, a WiMax network, and/or any other suitable communication network.

Although advertising server device 202 and survey administration device 204 are illustrated as separate devices, any one or more of these devices can be combined into one device in some embodiments. Also, although only one each of exchange server advertising server device 202 and survey administration device 204 are shown in FIG. 1 to avoid over-complicating the figure, any suitable one or more of each device can be used in some embodiments.

Advertising server device 202, survey administration device 204, and user device 208 can be implemented using any suitable hardware in some embodiments. For example, in some embodiments, devices 202, 204, and 208 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Figure 3:
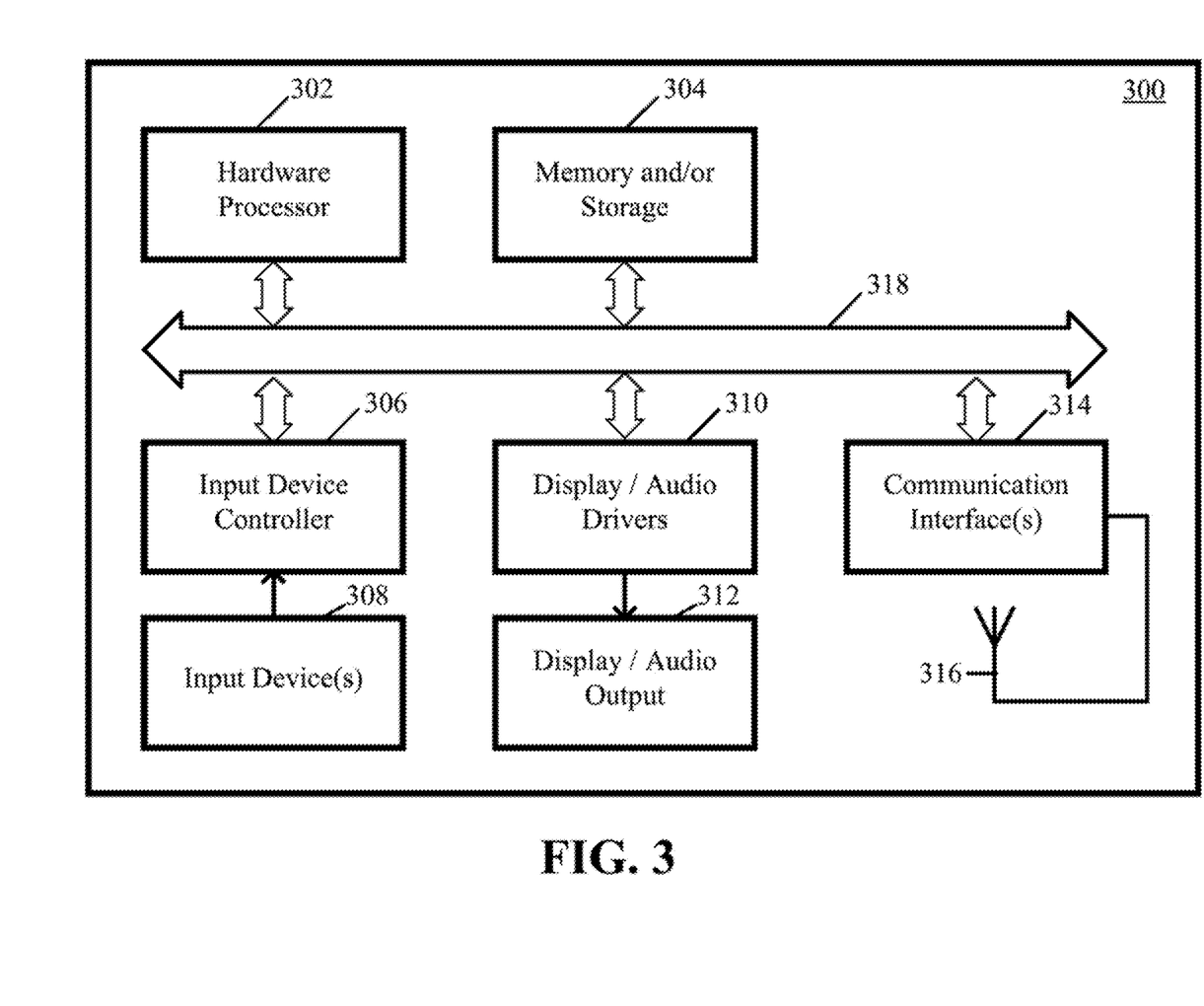
FIG. 3 shows a detailed example of hardware that can be used in a server and/or a user device of FIG. 2 in accordance with some embodiments of the disclosed subject matter.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from a device in some embodiments. For example, input device controller 306 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output circuitries 312 in some embodiments. For example, display/audio drivers 310 can be circuitry for driving an LCD display, a speaker, an LED, or any other type of output device.

Communication interface(s) 314 can be any suitable circuitry for interfacing with one or more communication networks, such as network 106 as shown in FIG. 1. For example, interface(s) 314 can include network interface card circuitry, wireless communication circuitry, and/or any other suitable type of communication network circuitry.

Antenna 316 can be any suitable one or more antennas for wirelessly communicating with a communication network in some embodiments. In some embodiments, antenna 316 can be omitted when not needed.

Bus 318 can be any suitable mechanism for communicating between two or more components 302, 304, 306, 310, and 314 in some embodiments.

Any other suitable components can be included in hardware 300 in accordance with some embodiments.

It should be understood that the mechanisms described herein can, in some embodiments, include server-side software, server-side hardware, client-side software, client-side hardware, or any suitable combination thereof. For example, the mechanisms described herein can encompass a computer program written in a programming language recognizable by a server and/or by a user device (e.g., a program written in a programming language, such as, Java, C, Objective-C, C++, C#, JavaScript, Visual Basic, or any other suitable approaches). As another example, the mechanisms described herein can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps can be executed or performed in any order or sequence not limited to the order and sequence shown and described in the figures. Also, some of the above steps can be executed or performed substantially simultaneously where appropriate or in parallel to reduce latency and processing times. It should also be noted that, as used herein, the term mechanism can encompass hardware, software, firmware, or any suitable combination thereof.

Accordingly, methods, systems, and media for determining the impact of content campaigns using surveys are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for determining an impact of content, the method comprising:
    receiving, using a hardware processor of a server device, a plurality of users for receiving a content item in a content campaign, wherein each of the plurality of users is associated with a user identifier and the content item is associated with a content identifier;
    dividing, using the hardware processor, the plurality of users into a test group and a control group by:
        receiving, for each user of the plurality of users, a request for loading a content item on a web page, wherein the request included code that directs the request to the server device to insert a parametrized pixel image for receiving survey administration information and content information;
        inserting a parametrized pixel image into the code, wherein the parametrized pixel image is loaded in connection with the content item being presented on the web page and wherein the parameterized pixel image is associated with a user of the plurality of users;
        causing the parametrized pixel image to be loaded on a web browsing application executing on a user device in connection with the content item being presented on a web page;
        determining whether the content item including the parametrized pixel image was scrolled into view by determining whether the parametrized pixel image has been rendered by the web browser application executing on the user device;
        automatically assigning the user to one of the test group and the control group based on an amount of time that the parametrized pixel image has been displayed in view by the web browser application executing on the user device, wherein the user device associated with the user in the control group is inhibited from receiving the content item having the content identifier and is presented with a different content item and wherein the user device associated with the user in the test group is presented with the content item associated with the content campaign on the web page and additional content items associated with the content campaign until a particular exposure level has been reached; and generating a first record that includes the content identifier, the user identifier, and a viewability indication corresponding to the presentation of the content item by the web browsing application executing on the user device;

transmitting, using the hardware processor, for the parametrized pixel image, the user identifier and the content identifier to a survey administration device;

causing, using the hardware processor, an offer to participate in a survey to be transmitted to each user device in the test group and the control group;

matching, using the hardware processor, each survey response received from the survey with one of a plurality of user identifiers, wherein each survey response corresponds to the survey presented on the web browser application executing on the user device and is associated with the parametrized pixel image, and wherein the survey is generated to include a plurality of questions selected to measure an impact of the content campaign and the content item with attitudinal metrics;

retrieving, using the hardware processor, a second record from the survey administration device that includes a plurality of user identifiers and a plurality of survey responses associated in which each survey response is associated with one of the plurality of user identifiers based on the matching;

determining, using the hardware processor, whether the survey responses associated from the second record match with the first record that includes the content identifier, the user identifier, and a viewability indication corresponding to the presentation of the content item by the web browsing application executing on the user device, wherein each of the survey responses in the survey is mapped to a response score and wherein the survey responses are associated with one of first response scores and second response scores;

generating, using the hardware processor, a first content viewing history for the test group that includes content items in which survey responses were received for each of the plurality of users assigned to the test group matched the survey responses in the second record with content viewability information in the first record, wherein a first group-level survey response score for the first content viewing history is determined for the test group based on the first response scores;

generating, using the hardware processor, a second content viewing history for the control group that includes content items in which survey responses were received for each of the plurality of users assigned to the control group matched the survey responses in the second record with content viewability information in the first record, wherein a second group-level survey response score for the second content viewing history is determined for the control group based on the second response scores;

determining, using the hardware processor, an effectiveness score of the content item by determining a difference between the first group-level survey response score and the second group-level survey response score and determining whether a statistical significance on the difference between the first group-level survey response score and the second group-level survey response score exists; and inhibiting, using the hardware processor, the content item associated with the web page from being presented on the user device based on the effectiveness score and replacing the content item with a second content item.

2. The method of claim 1, wherein the request is directed to a first server device for retrieving the content item for presentation on the web page, wherein the code included with the request redirects the request to a second server device for inserting the parametrized pixel image into the request, and wherein the first server device and the second server device are different.

3. The method of claim 1, wherein the parametrized pixel image associated with the content item is received from the survey administration device and wherein the parametrized pixel image is associated with the content identifier.

4. The method of claim 1, wherein the user associated with the user identifier is assigned to the test group in response to determining that the parametrized pixel image was rendered by the web browser application executing on the user device and wherein the test group is modified to include the user identifier.

5. The method of claim 1, wherein the user associated with the user identifier is assigned to the control group in response to determining that the parametrized pixel image was not rendered by the web browser application executing on the user device and wherein the control group is modified to include the user identifier.

6. The method of claim 1, further comprising generating the control group by randomly assigning the user associated with the user identifier to the control group, wherein the control group is modified to include the user identifier.

7. The method of claim 1, further comprising randomly assigning the user associated with the user identifier to one of the test group and the control group in response to receiving the request for loading the content item on the web page.

8. The method of claim 1, wherein the different content item is a public service announcement that replaces the presentation of the content item on the web page.

9. The method of claim 1, further comprising, in response to assigning the user associated with the user identifier to the control group, transmitting a do-not-target content notification to a content provider associated with the content campaign.

10. The method of claim 1, further comprising, in response to determining that the particular exposure level has been reached, inhibiting one or more content item associated with the content campaign from being presented and transmitting a do-not-target content notification to a content provider associated with the content campaign.

11. The method of claim 1, further comprising generating a plurality of subsets of the test group that each includes statistically similar users based on the first content viewing history associated with each of the plurality of users associated to the test group, wherein the first group-level survey response score is determined for each of the plurality of subsets of the test group and wherein a comparison is performed between the first group-level survey response score associated with each of the plurality of subsets of the test group to determine whether a statistical significance exists.

12. The method of claim 1, further comprising generating a subset of the control group that includes statistically similar users based on the first content viewing history associated with each of the plurality of users associated to the control group, wherein the second group-level survey response score is determined for the subset of the control group.

13. A system for determining an impact of content, the system comprising:
a memory; and
a hardware processor that, when executing computer executable instructions stored in the memory, is configured to:
receive a plurality of users for receiving a content item in a content campaign, wherein each of the plurality of users is associated with a user identifier and the content item is associated with a content identifier to insert a parametrized pixel image for receiving survey administration information and content information;
divide the plurality of users into a test group and a control group by:
(i) receiving, for each user of the plurality of users, a request for loading a content item on a web page, wherein the request included code that directs the request to a server device;
(ii) inserting a parametrized pixel image into the code, wherein the parametrized pixel image is loaded in connection with the content item being presented on the web page and wherein the parameterized pixel image is associated with a user of the plurality of users;
(iii) causing the parametrized pixel image to be loaded on a web browsing application executing on a user device in connection with the content item being presented on a web page;
(iv) determining whether the content item including the parametrized pixel image was scrolled into view by determining whether the parametrized pixel image has been rendered by the web browser application executing on the user device;
(v) automatically assigning the user to one of the test group and the control group based on an amount of time that the parametrized pixel image has been displayed in view by the web browser application executing on the user device, wherein the user device associated with the user in the control group is inhibited from receiving the content item having the content identifier and is presented with a different content item and wherein the user device associated with the user in the test group is presented with the content item associated with the content campaign on the web page and additional content items associated with the content campaign until a particular exposure level has been reached; and
(vi) generating a first record that includes the content identifier, the user identifier, and a viewability indication corresponding to the presentation of the content item by the web browsing application executing on the user device;
transmit, for the parametrized pixel image, the user identifier and the content identifier to a survey administration device;
cause an offer to participate in a survey to be transmitted to each user device in the test group and the control group;
match each survey response received from the survey with one of a plurality of user identifiers, wherein each survey response corresponds to the survey presented on the web browser application executing on the user device and is associated with the parametrized pixel image, and wherein the survey is generated to include a plurality of questions selected to measure an impact of the content campaign and the content item with attitudinal metrics;
retrieve a second record from the survey administration device that includes a plurality of user identifiers and a plurality of survey responses associated in which each survey response is associated with one of the plurality of user identifiers based on the matching;
determine whether the survey responses associated from the second record match with the first record that includes the content identifier, the user identifier, and a viewability indication corresponding to the presentation of the content item by the web browsing application executing on the user device, wherein each of the survey responses in the survey is mapped to a response score and wherein the survey responses are associated with one of first response scores and second response scores;
generate a first content viewing history for the test group that includes content items in which survey responses were received for each of the plurality of users assigned to the test group matched the survey responses in the second record with content viewability information in the first record, wherein a first group-level survey response score for the first content viewing history is determined for the test group based on the first response scores;
generate a second content viewing history for the control group that includes content items in which survey responses were received for each of the plurality of users assigned to the control group matched the survey responses in the second record with content viewability information in the first record, wherein a second group-level survey response score for the second content viewing history is determined for the control group based on the second response scores;
determine an effectiveness score of the content item by determining a difference between the first group-level survey response score and the second group-level survey response score and determining whether a statistical significance on the difference between the first group-level survey response score and the second group-level survey response score exists; and
inhibit the content item associated with the web page from being presented on the user device based on the effectiveness score and replace the content item with a second content item.

14. A non-transitory computer-readable medium containing computer-executable instructions that, when executed by a hardware processor, cause the hardware processor to perform a method for determining an impact of content, the method comprising:
receiving a plurality of users for receiving a content item in a content campaign, wherein each of the plurality of users is associated with a user identifier and the content item is associated with a content identifier to insert a parametrized pixel image for receiving survey administration information and content information;

dividing the plurality of users into a test group and a control group by:
(i) receiving, for each user of the plurality of users, a request for loading a content item on a web page, wherein the request included code that directs the request to a server device;
(ii) inserting a parametrized pixel image into the code, wherein the parametrized pixel image is loaded in connection with the content item being presented on the web page and wherein the parameterized pixel image is associated with a user of the plurality of users;
(iii) causing the parametrized pixel image to be loaded on a web browsing application executing on a user device in connection with the content item being presented on a web page;
(iv) determining whether the content item including the parametrized pixel image was scrolled into view by determining whether the parametrized pixel image has been rendered by the web browser application executing on the user device;
(v) automatically assigning the user to one of the test group and the control group based on an amount of time that the parametrized pixel image has been displayed in view by the web browser application executing on the user device, wherein the user device associated with the user in the control group is inhibited from receiving the content item having the content identifier and is presented with a different content item and wherein the user device associated with the user in the test group is presented with the content item associated with the content campaign on the web page and additional content items associated with the content campaign until a particular exposure level has been reached; and
(vi) generating a first record that includes the content identifier, the user identifier, and a viewability indication corresponding to the presentation of the content item by the web browsing application executing on the user device;

transmitting, for the parametrized pixel image, the user identifier and the content identifier to a survey administration device;

causing an offer to participate in a survey to be transmitted to each user device in the test group and the control group;

matching each survey response received from the survey with one of a plurality of user identifiers, wherein each survey response corresponds to the survey presented on the web browser application executing on the user device and is associated with the parametrized pixel image, and wherein the survey is generated to include a plurality of questions selected to measure an impact of the content campaign and the content item with attitudinal metrics;

retrieving a second record from the survey administration device that includes a plurality of user identifiers and a plurality of survey responses associated in which each survey response is associated with one of the plurality of user identifiers based on the matching;

determining, using the hardware processor, whether the survey responses associated from the second record match with the first record that includes the content identifier, the user identifier, and a viewability indication corresponding to the presentation of the content item by the web browsing application executing on the user device, wherein each of the survey responses in the survey is mapped to a response score and wherein the survey responses are associated with one of first response scores and second response scores;

generating a first content viewing history for the test group that includes content items in which survey responses were received for each of the plurality of users assigned to the test group matched the survey responses in the second record with content viewability information in the first record, wherein a first group-level survey response score for the first content viewing history is determined for the test group based on the first response scores;

generating a second content viewing history for the control group that includes content items in which survey responses were received for each of the plurality of users assigned to the control group matched the survey responses in the second record with content viewability information in the first record, wherein a second group-level survey response score for the second content viewing history is determined for the control group based on the second response scores;

determining an effectiveness score of the content item by determining a difference between the first group-level survey response score and the second group-level survey response score and determining whether a statistical significance on the difference between the first group-level survey response score and the second group-level survey response score exists; and inhibiting the content item associated with the web page from being presented on the user device based on the effectiveness score and replacing the content item with a second content item.

* * * * *